United States Patent [19]
Freudenschuss

[11] 3,926,512
[45] Dec. 16, 1975

[54] SOUND PROJECTOR

[75] Inventor: Otto Freudenschuss, Vienna, Austria

[73] Assignees: Karl Vockenhuber; Raimund Hauser, both of Vienna, Austria

[22] Filed: Jan. 25, 1974

[21] Appl. No.: 436,597

[30] Foreign Application Priority Data
Feb. 19, 1973  Austria .............................. 1425/73

[52] U.S. Cl. .................................... 352/25; 352/12
[51] Int. Cl.² ......................................... G03B 31/00
[58] Field of Search ............ 352/12, 13, 25, 27, 29, 352/30, 169

[56]  References Cited
UNITED STATES PATENTS

| | | | |
|---|---|---|---|
| 3,376,093 | 4/1968 | Freudenschuss | 352/25 |
| 3,471,228 | 10/1969 | Martin | 352/29 X |
| 3,650,609 | 3/1972 | Lancor | 352/25 X |

Primary Examiner—Fred L. Braun
Attorney, Agent, or Firm—Ernest G. Montague; Karl F. Ross; Herbert Dubno

[57] ABSTRACT

A sound-film projector has a motor which drives a film-traction claw and a flywheel-driven spindle which, with a pinch roller, provides a driving nip for advancing the sound strip. The drive from the motor to the claw is interruptable and the nip is openable to prevent entrainment of the sound strip despite continuing rotation of the flywheel. A single deactivating lever is used to disengage and re-engage both drives simultaneously. In this way loss of initial synchronization caused by the acceleration time of the flywheel is avoided because the flywheel is continuously run at its operating speed. The deactivating lever may be remotely controlled.

17 Claims, 10 Drawing Figures

SOUND PROJECTOR

This invention relates to a sound-film projector and is more specifically concerned with one having a projection window formed in a film gate having an associated intermittently operated film-traction element, such as a claw, and a drive nip formed between a pinch roller and a flywheel-driven audio spindle which is designed to entrain a sound, strip and which is driven from the same motor as the film-traction element.

STATE OF THE ART

In known sound projectors it is common practice, in post-synchronization or in subsequent transcription from a magnetic tape to a magnetic track on a strip alongside the film, to place the first image of the scene, which is to be provided with sound, in the image window of the projector, then to reverse the film by a few frames and finally to adjust the recording tape so that the beginning of the audio scene coincides with the film scene after both sets of apparatus have started. This calls for great sensitivity even if the work is facilitated by a timing mechanism. Despite substantial experience in this technique a user will frequently be unsuccessful in achieving a good match of the scene to the sound and often parts of a preceding sound recording are erased in the course of such work. Synchronization systems have been proposed which utilize electric signals which are periodically transmitted with a running sound tape. In this case a phase shift by one or even more frames of the films with respect to the tape is possible and there are difficulties in obtaining synchronization when running the film and/or tape up to speed. Such systems are also relatively sophisticated, complicated and therefore costly and generally act to discourage an amateur from applying sound to a film himself.

OBJECT OF THE INVENTION

The object of the invention is to facilitate synchronization or transcription of sound recordings used with a sound-film projector.

THE INVENTION

In accordance with the present invention there is provided a sound-film projector having a motor; a flywheel driven by the motor; a sound spindle rotated by the flywheel; a pinch roller defining with the spindle a strip-driving nip; a deactivating device operable to prevent rotation of the spindle entraining the sound strip between the roller and spindle; a film-projection window; an intermittently operating traction element imparting indexing motion to the film past the window on being coupled to the motor shaft; a decupling member operable to disconnect the motor shaft from the traction element; and, quick-start means controlling the deactivating device and the decoupling member when in their operated conditions and operable, while the flywheel is driven at its running speed by the motor, to restore the nip drive to the strip while simultaneously re-coupling the traction element to the motor shaft.

An advantage of the invention is that the flywheel mass, which is primarily responsible for loss of synchronization during acceleration to full speed, is driven at its operating speed when the film is stationary and the parts which have to be operated when both the film and the sound strip are to be run in synchronism are restricted to components which have a relatively low mass and which therefore require a negligible time lag to attain their operating synchronized speed. In an extreme case it is merely necessary to start the claw which has only a low mass. Running up to speed can therefore be achieved almost instantaneously and it is sufficient to place the first frame of the scene to which sound is to be added in the frame window after which the transcription may commerce as soon as the sound is correct. The user of the apparatus is therefore not compelled to estimate the running-up time and the previous professional experience required to obtain good synchronization between the film and the sound strip is no longer necessary.

BRIEF DESCRIPTION OF THE DRAWING

The invention will now be described in more detail, by way of example, with reference to the accompanying drawing, in which.

Figure 1:
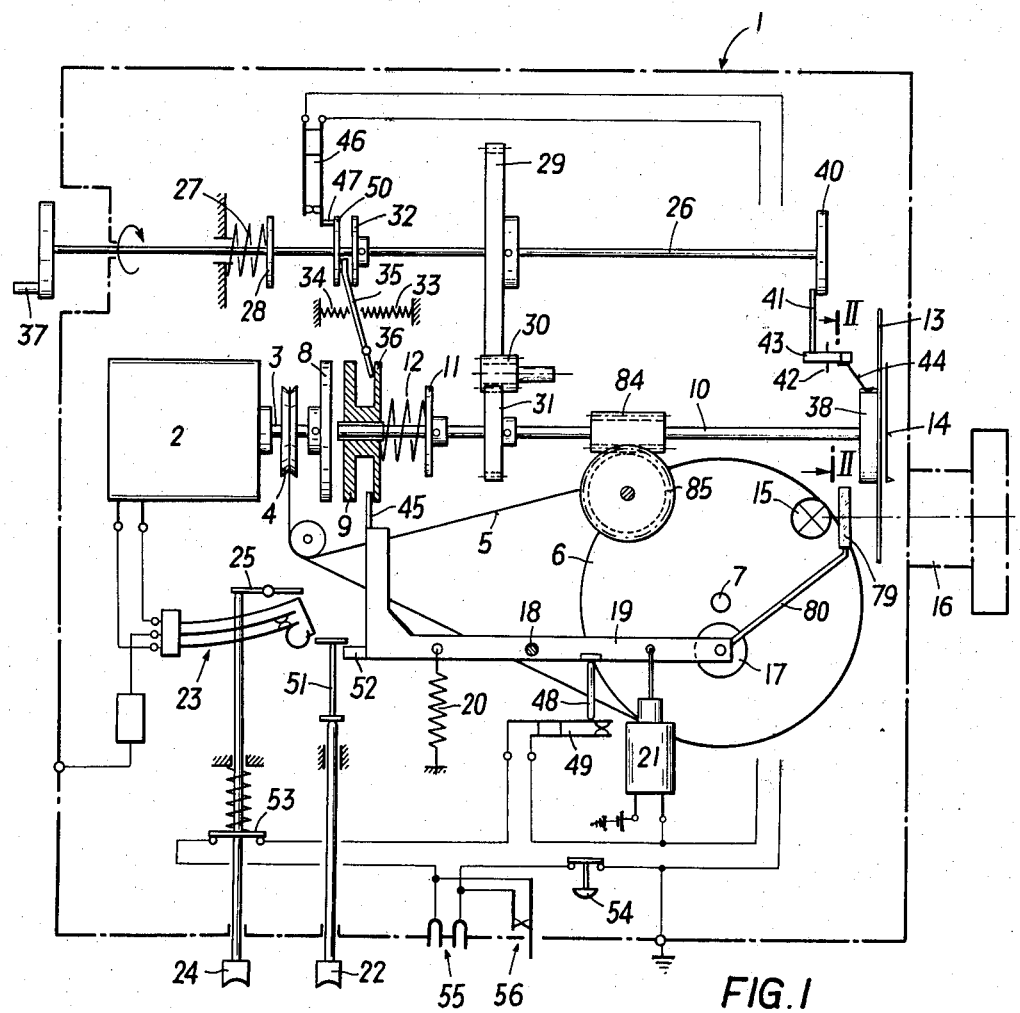
FIG. 1 illustrates, in outline, a sound-film projector embodying my invention and shows diagrammatically and partly in section drives for the projection of the film and a sound strip, and also an electrical energization circuit which is partially broken away.

In the following description of a sound-film projector according to my invention only those parts which are necessary for an understanding of the invention itself are describe; other parts, well-known per se but which play no active part in the operation of the invention being omitted for the sake of brevity and clarity.

SPECIFIC DESCRIPTION

The sound projector 1 is provided with a motor 2 having a shaft 3 which carries a grooved pulley 4 from which a drive belt 5 extends around a flywheel 6 which, at its center, is provided with a sound spindle 7. The shaft 3 carries at its end a clutch disc 8 which faces a coaxially arranged clutch disc 9 which is slicable along a main spindle 10 but is splined to it so that the two rotate together. The clutch disc 9 is resiliently biased towards the disc 8 by a coiled compression spring 12 encircling the spindle 10 and mounted between the disc 9 and an abutment disc 11.

Figure 2:
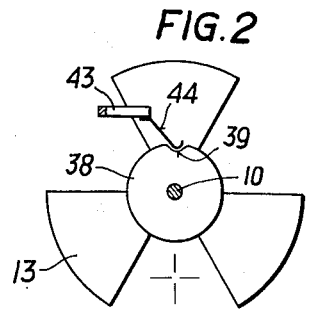
FIG. 2 is a view of a three-bladed shutter as viewed in the direction indicated by the arrows II—II in FIG. 1.

At its end opposite the clutch disc 9, the spindle 10 carries a three-bladed shutter disc 13, shown in more detail in FIG. 2, and also cams known per se for producing film-traction movement of a claw 14 associated with a film gate not shown, including a face cam 74 (FIGS. 3 and 3A) and a supplemental cam 38. The claw 14 produces indexing movement of film frames through an optical path extending between a projection lamp 15 and a projection lens 16. Adjacent the shutter 13 the spindle 10 carries the supplemental cam 38 which has a peripheral depression or dimple 39.

Intermediate its ends the main spindle 10 has attached to it a pinion 31 which transmits drive by way of an intermediate gear 30 to a gear wheel 29 fixed to an axially slidable control spindle 26. At one end the control spindle 26 carries a flange 40 which, with sliding movement of the spindle 26, cooperates with a pin 41 connected with a lever 43 having a fulcrum 42 and provided with a finger spring 44 which engages the dimpled rim of the supplemental cam 38. A spring, now shown, applies a permanent bias to the lever 43 and acts to hold the spring 44 resiliently out of engagement with the dimpled rim of the cam 38 unless the control spindle 26 is moved to the left in FIG. 1 to the position shown in the drawing.

The spindle 26 is axially slidable against the thrust of a coiled compression spring 27 engaging between a flange 28 fixed to the spindle 26 and a fixed part of the projector diagrammatically illustrated. At one end the control spindle 26 projects from a rebate in the wall of the projector and contains within the rebate a crank 37 which enables the spindle 36 to be slid to the left. When the crank 37 is located within the rebate the spring 27 slides the spindle 26 to the right so that the flange 40 is disengaged from the pin 41 with the result that: the indexing spring 44 is disengaged from the rim of cam 38; the gear wheel 29 is moved out of mesh with the intermediate gear wheel 30; and the gap between a pair of spaced collars 32 and 50 mounted on the control spindle 26 is located to the right of the position shown. A first-order lever 35 engages at one end between the collars 32 and 50 and engages at its other end in an annular groove provided between the clutch disc 9 and a spaced parallel flange 36. A pair of springs 33 and 34 urge the lever 35 towards a central position in which the clutch disc 9 is able to engage the clutch disc 8 when the crank 37 is located in the projector-casing rebate.

Also engaging between the clutch disc 9 and the flange 36 is a pawl 45 provided on one end of a bell-crank lever 19, serving as a deactivating device pivoted intermediate its end at 18 and carrying on its other end a pinch roller 17 which cooperates with the sound spindle 7 for transportation of the sound strip. During such transportation a spring 20 acts on the lever 19 to hold the pinch roller 17 against the sound spindle 7. If strip transport is to cease, the lever 19 is rocked against the bias of the spring 20 by energization of a solenoid 21. Adjacent the pinch roller 17 the lever 19 carries an arm 80 provided at its end with a filter 79 which is interposed in the optical path between the lamp 15 and the lens 16 during times when a single film frame is held stationary in the optical path.

The projector 1 is provided with an ON button 22 whose motion is transmitted by way of a tappet 51 to close a microswitch shown diagrammatically at 23. An OFF button 24 adjacent the button 22 operates to open the microswitch 23 by way of an operating lever 25 having a central fulcrum. A conductive plate 53 on the stem of OFF button 24 acts as a contact in an electrical circuit and is engaged by a coiled compression spring which urges the OFF button 24 to the position shown in FIG. 1. The tappet 51 associated with the ON button 22 is also responsive to the position of the bell-crank lever 19 which is provided with a tongue 52 engaging beneath one end of the tappet 51. The lever 19 also controls the position of a push rod 48 which controls a self-holding circuit for the solenoid 21 provided with a switch 49. The contacts of the switch 49 are connected in series with a pair of contacts bridges by the plate 53 and being further in series with a pair of contacts 56 which are opened automatically when a plug is inserted into an associated pair of electrical sockets 55 which shunt the contact pair 56. Also in series in the same circuit is a quick-start button 54 which is operable of being manually operated.

The circuit above described and leading from the live pole of the solenoid 21 is shunted by a parallel electrical circuit which extends to a switch 46 controlled by the position of the axially movable control spindle 26. The contacts of the switch 46 are controlled by an extension 47 attached to one of the contact, which hold the switch 46 closed when the collar 50 of the spindle 26 is in the position shown, i.e. when the crank is withdrawn from the rebate in the projector casing.

OPERATION

To add a sound background to the film to be projected it is necessary for the film and sound to commence simultaneously in synchronism. To achieve this the first frame of the film scene to which sound is to be added is moved into the optical path of the projection lamp 15. This is effected by withdrawing the cranked handle 37 from its rebate in the casing and subsequently rotating it. The withdrawal of the handle 37 from the rebate simultaneously disengages the clutch discs 8 and 9 by means of the lever 35 and simultaneously couples the control spindle 26 by way of the meshing gears 29, 30 and 31 to the main spindle 10. When the cranked handle 37 is withdrawn to the left, the switch 46 is closed to energize the solenoid 21 and cause the lever 19 to rotate in a clockwise direction around the fulcrum 18. This introduced the pawl 45 into the annular gap between the clutch disc 9 and the flange 36 so that the clutch is held in the disengaged position. In this way the slight bias provided by the spring 27 acting to urge the handle 37 back into the rebate in the projector, is not supplemented by the much greater force of the clutch spring 12 acting by way of the lever 35 and the collar 32 on the control spindle 36. The rotation of the bell-crank lever 19 disengages the strip transport provided by the engagement of the pinch roller 17 with the strip-drive spindle 7. Additionally the self-holding switch 49 is closed by the push rod 48 acted upon by the lever 19, with the result that the solenoid 21 is held energized even when subsequent opening of the contacts 46 occurs for the following reason.

The introduction of the pawl 45 of the lever 19 into the annular groove between the clutch disc 9 and the flange 36 holds the clutch disc 9 in the position shown. As soon as the handle 37 is released the control spindle 26 is allowed to move a small distance towards the right under the action of the spring 27 and also the two centering springs 33 and 34 which cooperate with the lever 35. This motion to the right ceases when the end of the lever 35 has moved from the position where it engages the flange 36 to a position where it engages the rear surface of the clutch disc 9. This motion is sufficient to open the switch 46 but, as previously stated, the solenoid 21 remains energized by way of the self-holding switch 49. The bell-crank lever 19 also causes the motor 2 to run by closure of the microswitch 23 in response to the movement of the tappet 51, such movement taking place either as the result of the movement of the tongue 52 of the lever 19 or in response to prior activation of the motor through depression of the ON button 22.

In order to ensure that the sound commences when the first film frame corresponding to the sound it projected, the user turns the crank handle 37 which allows the main shaft 10 to turn in either direction so that the projected film can be wound forward and backward by the handle 37. The light filter 79 prevents the film frame in the optical path from being damaged by its prolonged exposure to the lamp 15.

As is apparent from FIG. 2 the shutter has three blades. When the first blade passes through the optical path, the next film frame is moved into the path and, subsequently, the other two blades traverse that light path. Each indexing step of the claw 14 is accompanied by three bright phases but it is necessary for the sound to commence simultaneously with the first bright phase. The purpose of the dimpled cam 38 is to indicate to the operator that the first bright phase is being projected. As the operator turns the cranked handle 37 the indexing spring 44 drops into the dimple 39 at each first bright phase and the operator senses the increased resistance this presents to rotation of the handle 37 so that he is aware that the first bright phase is being projected. When the operator has set up the first frame in the first bright phase he can turn his attention to starting the strip recording from which the background sounds are to be played with the film. As soon as the correct sound scene for the projected film frame is heard, it is merely necessary to interrupt the self-holding circuit of the solenoid 21. The spring 20 rotates the lever 19 promptly in a counterclockwise direction to bring the pinch roller 17 against the sound spindle 7 so that the sounds are recorded in synchronism with the film running. Simultaneously, the movement of the lever 19 releases the clutch disc 9 and its movement towards the clutch disc 8 is accompanied by movement to the right of the control spindle 26 under the action of the lever 35 and the centering springs 33, 34 together with the bias spring 27. Thus, just prior to engagement of the clutch discs, the gearwheel 29 disengages itself from the pinion 30 and the torque of the continuously rotating motor shaft 3 is transmitted immediately to the film claw 14. As the parts accelerated by the main spindle 10 are of relatively small mass, the running-up time of the film drive and the sound strip trapped between the spindle and pinch roller 17 is very small indeed. Several different switching facilities are provided for interrupting the self-holding circuit of the solenoid 21. In addition to the switch plate 53 of the OFF button 24, which also switches off the motor 2, the interrupting signal may be provided by way of the sockets 55 or by smart manual depression of the quick-start button 54 when the user hears the correct sound commencing.

The plug socket 55 enables transcription of the sound to the sound strip for the film from a separately driven sound tape and in this case it is advantageous to control the self-holding circuit of the solenoid 21 directly from the sound tape or the beginning of the sound scene as will now be described with reference to FIGS. 4 to 6 which show additional circuitry.

Figure 4:
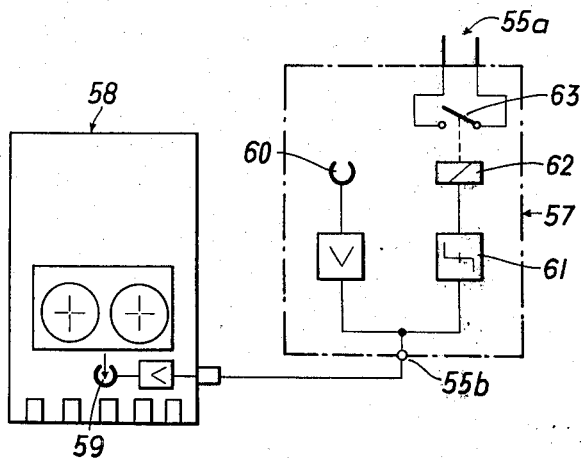
FIG. 4 shows a tape recorder which may have its output fed into a sound-recording section of the projector and illustrates additional circuitry for this purpose.

FIG. 4 shows a conventional tape recorder 58 having a recording head 59 from which sound signals are fed into the additional circuitry 57. This circuitry is provided with a plug 55a which cooperates with the plug socket 55 of the projector 1 and, when so fitted, simultaneously causes opening of the shunted contacts 56. The sound signal entering the circuitry 57 at terminal 55b is fed to two circuits the first of which comprises an amplifier and a recording head 60 by way of which the sound signal is applied to the sound strip running through the projector 1. The signals from the terminal 55b are also fed through a threshold switch 61 to a relay 62 having a contact 63 which is normally closed and is arranged to bridge the plug contacts 55a.

When the tape recorder 58 is started, the leader of the recording tape is played off and no sound is detected by the recording head 59. At the beginning of the sound scene, the incoming audio signal operates the threshold switch 61 which energizes the relay 62 so that the self-holding circuit of the solenoid 21 is broken and, simultaneously, the clutch discs 8 and 9 are engaged and the claw 14 is set in operation.

In a modification of the arrangement shown in FIG. 4, instead of the additional circuitry being provided externally of the projector 1 such circuitry is incorporated into the projector and the socket 55 of FIG. 1 is replaced by the connection 55b of FIG. 4. The self-holding circuit of the solenoid 21 is then completed directly through the normally closed contact 63 of the relay 62.

Figure 5:
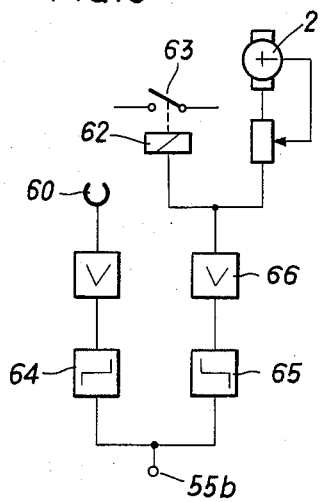
FIG. 5 shows a modification of the additional circuitry shown in FIG. 4.
Figure 7:
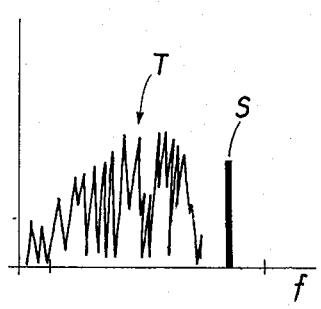
FIGS. 7–9 show different ways of using frequencies obtained from an audio tape in a tape recorder to remote control the electrical energization circuit described; the projector.

In the arrangement shown in FIG. 5 and 7 the parts of FIG. 5 corresponding to those of FIG. 4 are similarly referenced. The purpose of the circuitry in FIG. 5 is to provide the sound-film projector 1 with synchronizing signals in addition to audio signals. The onset of periodically delivered synchronizing signals at a frequency S (FIG.3) lying outside of the audio-frequency range, is used to interrupt the self-holding circuit of the solenoid 21. Signals received from the tape recorder at terminal 55b are passed through a low-pass filter 64 to the recording head 60, and through a high-pass filter 65, set to a frequency above the range of audio-frequency signals, to an amplifier 66. The output of the amplifier is fed to the relay 62 which therefore responds to the detection of a synchronizing signal by opening the solenoid self-holding circuit, and simultaneously the synchronizing pulses S are fed to a control circuit for the motor 2 for regulating its speed.

Figure 6:
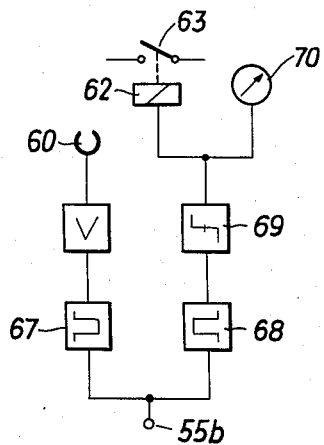
FIG. 6 shows a further modification of this additional circuitry.
Figure 8:
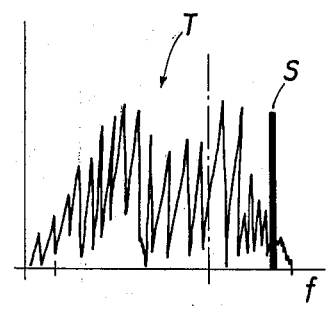

FIGS. 6 and 8 show a further way of providing the motor 2 of FIG. 1 with speed-synchronizing signals as well as providing the recording head of the projector 1 with audio signals. As is apparent from FIG. 8, the synchronizing signals S are recorded at high amplitude within the audio-frequency range rather than outside of it as in FIG. 7. Incoming signals from the tape recorder are received at terminal 55b of the additional circuitry and are fed through a band-stop filter 67 tuned to provide a high temperature to signals at the frequency S. The audio signals which pass through the filter 67 are supplied to the projector recording head. The signals at the terminal 55b are also fed through a band-pass filter 68, tuned to the frequency S, onwards to a threshold switch 69 controlling by its output the energization of the relay 62 whose contact 63 is normally closed and is located in the self-holding circuit of the solenoid 21. The output of the threshold switch 69 is also fed to a tachometer 70.

Signals at the frequency corresponding to the synchronizing signals S are passed by the filter 68 to the threshold switch 69 and if their amplitude is sufficiently large to indicate that they are, in fact, synchronizing signals and not just sounds at the same frequency, they trip the threshold switch 69 to de-energize the self-holding circuit of the solenoid 21. Simultaneously the tachometer 70 provides an output usable to synchronize the speed of the drive motor 2.

Figure 9:
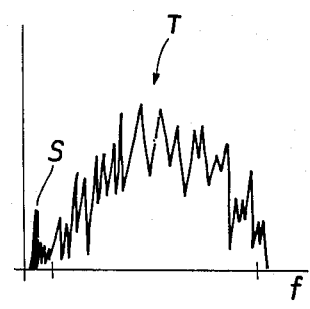

FIG. 9 shows how camera noise itself, if present in the audio frequency entering the terminal 55b in FIG. 6, may be used to de-energize the self-holding circuit of the solenoid 21. As is apparent from FIG. 9, the noise produced by a camera film-traction claw has a maximum at the lower end of the audible frequency range, normally at about 18 Hz. This frequency may be used in a circuit as shown in FIG. 6 but having the band-pass and band-stop filters 68, 67 respectively tuned to the peak frequency of camera claw noise.

Figure 3:
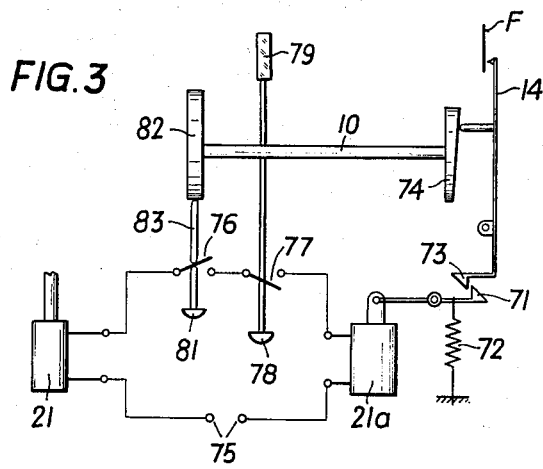
FIG. 3 is a circuit diagram of an alternative energization circuit.

FIG. 3 shows schematically and in very much simplified form an alternative arrangement to that shown in FIG. 1. In FIG. 3 the main spindle 10 is continuously driven by the drive motor 2 and the use of a clutch is avoided. The main spindle 10 carries an ancillary cam 82 and a claw-engagement cam 74 which controls the engagement motion of a film-traction claw 14 with perforations of a film strip diagrammatically shown at F.

In place of the single solenoid 21 shown in FIG. 1, two solenoids 21 and 21a are provided, solenoid 21 controlling operation of the pinch roller 17 (not illustrated in this FIGURE) whereas solenoid 21a via coacting ratchet teeth keeps the claw 14 out of engagement with the perforations in the film F. For this purpose the claw 14 is constructed as a lever having a tooth 73 located at a position where it can be engaged by a tooth 71 when the solenoid 21a is energized. A coil spring 72 holds the two teeth out of engagement with one another at times when the solenoid 21 is not energized.

The solenoid 21a is connected in a series energization circuit provided with power from a pair of terminals 75. The circuit also includes the second solenoid 21 associated with the pinch roller, and two contacts 76 and 77 respectively associated with press buttons 81 and 78.

Contact 76 is normally closed whereas contact 77 is normally open. As long as the solenoids are not energized, the movement of the claw 14 is controlled by the cam 74 together with an associated cam not shown but known per se.

If button 78 is depressed, the two solenoids 21, 21a are energized and the recording on the strip associated with the film ceases as a result of the pinch roller being moved away from the flywheel spindle 7 (see FIG. 1). Motion of the spindle 10 continues until the cam 74 has pushed the claw 14 out of engagement with the perforations and simultaneously the tooth 73 is engaged by the tooth 71 which meanwhile has been raised to the position shown in FIG. 3 by energization of the solenoid 21a. The two teeth cooperate with one another to hold the claw 14 disengaged from the film which therefore remain stationary in the optical path between the lamp 15 and the projection lens 16. Depression of the push button 78 simultaneously brings a filter 79 into the optical path to attenuate the light projected through the stationary film.

If the push button 81 is now depressed, the two solenoids 21a and 21 are de-energized and the former solenoid allows the claw 14 to be controlled by the cam 74 turned by the main spindle 10. However, the other cam 82 is also turned and after the claw 14 has completed one cycle the cam 82 causes a rider 83 to reclose the contact 76 so that the energization circuit of the two solenoids is restored and the claw 14 is once again held out of engagement with the film F. The two solenoids 21, 21a are constructed with different operating characteristics.

With the arrangement shown in FIG. 3 it is relatively easy to detect the beginning of a scene as successive frames may be examined in turn by pressing the button 81 after the button 78 has been depressed. The arrangement is adaptable for use with the additional circuitry described above with reference to FIGS. 4 to 6 by providing the holding circuit of the two solenoids with a socket and linking switch 56 corresponding to the socket 55 in FIG. 1.

Figure 3A:
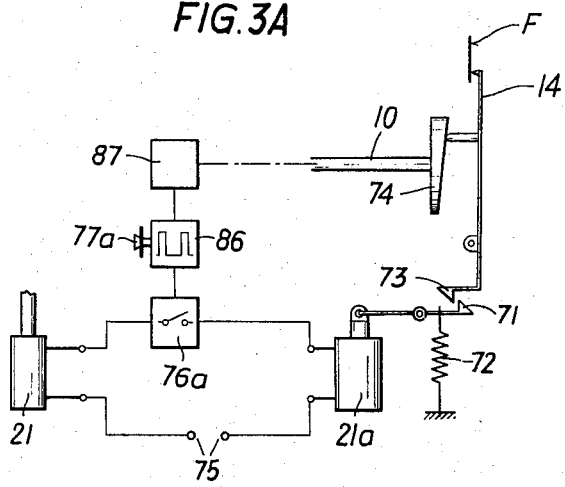
FIG. 3A is a second alternative energization circuit.

The circuit shown in FIG. 3A is substantially the same as that shown in FIG. 3 and corresponding parts are identically referenced. However, in place of the contact 76 which is mechanically controlled, a relay contact 76a is provided and is controlled by an oscillator 86 which provides output pulses to close the contact 76a while being synchronized with the motion of the main spindle 10 through one revolution so that the film is advanced by one film frame. The oscillator is triggered by a manual switch 77a which, when closed, causes the oscillator pulses to be generated at a relatively slow rate so that the film is advanced relatively slowly, for example one full frame per second. Synchronization is then obtained by a known synchronizing means in dependence on the rotations of the main spindle 10.

In the arrangements described above with reference to FIGs. 7 and 8, it is assumed that the synchronizing signals are provided on the same track of the tape recorder as the audio signals. However, the synchronizing signals could, if desired also, be provided by a separate track on a twin track tape known per se.

I claim:

1. A sound-film projector comprising: a motor provided with a shaft; a flywheel driven by the motor; a sound spindle rotatated by the flywheel; a pinch roller defining with the spindle nip for driving a sound strip; a deactivating device operable to prevent the rotation of the flywheel-driven spindle from entraining the sound strip between the roller and the spindle; a film-projection window; an intermittently operating traction element normally connected with said shaft for imparting indexing motion to a film aligned with the window; a decoupling member operable to disconnect said shaft from said traction element; and quick-start means controlling said deactivating device and said decoupling member in their operated positions and operable, while the flywheel is being driven at a normal speed by the motor, to restore the nip drive to the strip while simultaneously reconnecting the traction element with said shaft.

2. A projector as set forth in claim 1, in which the decoupling member is a clutch through which the motor torque is transmitted to the traction element, and the deactivating device operates by separating the pinch roller from the spindle so that the nip is opened.

3. A projector as set forth in claim 1, in which the traction element comprises a claw having its film-engaging motion controlled by a face cam driven by the motor, the decoupling member operates by holding the claw off the face cam and in its film-disengaged position, and the quick-start means includes solenoid means having energized and de-energized states in one only of which the deactivating device and the de-coupling member are both operated while in said other of the states the device and member are released to restore drive to the strip in the nip and to the film in the window.

4. A sound-film projector comprising: a motor provided with a shaft; a flywheel driven by the motor; a sound spindle rotated by the flywheel; a pinch roller defining with the spindle a nip for driving a sound strip; a lever operable to open the hip; a film-projection window; an intermittently operating traction claw imparting indexing motion to a film aligned with the window; a clutch normally engaged to couple said shaft to said claw, said clutch being disengageable by the operation of said lever against the action of a spring; resilient means providing a biasing force urging the lever to its unoperated position; a solenoid energizable to rock the lever against the biasing force to its operated position; and a quick-release circuit incorporating a de-energization switch and the solenoid whereby de-energization of the circuit by operation of the switch releases the solenoid and allows the lever to be rocked back by the biasing force to its unoperated position.

5. A projector as set forth in claim 4, including a manually actuated control spindle capable of being axially displaced as well as rotated, axial displacement of the control spindle in one direction disengaging the clutch while simultaneously engaging an alternative drive to the claw from the rotation of the control spindle and closing electrical contacts which energize the solenoid.

6. A projector as set forth in claim 4, in which the soldenoid is provided with two parallel energization circuits one of which is the quick-release circuit which also provides a self-holding circuit for the solenoid once operated, and the other energization circuit is energized by contacts which are closed in response to mechanical disengagement of the clutch, a part of the lever when in the operated position closing self-holding contacts in series in the quick-release circuit.

7. A projector as set forth in claim 4, in which the motor has a starting switch which is closable to start the motor by movement of the lever to its operated position as well as by separate motor-starting actuator.

8. A projector as claimed in claim 4, in which the motor has an operating switch which is operable to stop the motor by an actuator which interrupts the quick-release circuit substantially simultaneously with stopping the motor.

9. A sound-film projector comprising: a motor provided with a drive shaft; a flywheel driven by the motor; a sound spindle rotated by the flywheel; a pinch roller defining with the spindle a nip for driving a sound strip; a deactivating device operable to open the nip; a film-projection window; a traction claw imparting indexing motion to a film aligned with the window; a face cam normally connected with said shaft for disengaging the claw from the film; a decoupling member operable to disconnect said traction claw from said shaft; electromagnet means controlling said decoupling member and said deactivating device; and an electrical energization circuit for the electromagnet means incorporating a quick-release switch which, when actuated, causes the electromagnet means to respond by moving said deactivating device to restore the strip-drive nip while simultaneously moving the decoupling member to reconnect said traction claw with said shaft.

10. A projector as set forth in claim 9, in which the electromagnet means includes two solenoids one of which operates to lock the claw in a position in which it is not driven by the face cam and is spaced from the film-perforation position, the other solenoid operating to retract the pinch roller from the spindle.

11. A projector as set forth in claim 9, in which the electrical energization circuit includes a normally open and a normally closed manually operated switch, said normally open switch being movable to its closed position simultaneously with movement of a filter between the window and a projection lamp, said normally closed switch being movable to its open position for one revolution of the face cam under the control of ancillary cam means coupled with said face cam, said ancillary cam means reclosing said normally closed switch after said one revolution.

12. A projector as set forth in claim 9, including a shutter with several blades and a supplemental cam coupled with the face cam for rotation therewith; manually operable film-driving means mechanically coupled with the face cam upon disconnection of the latter from said shaft by the decoupling member for moving the film, one frame at a time, past the projection window; and a spring finger which rides on said supplemental cam during operation of said film-driving means for coaction with a peripheral formation in said supplemental cam to generate an increased resistance to such operation in a predetermined position of said blades with respect to the projection window.

13. A projector as set forth in claim 9, including additional circuitry having a tape-recorder audio-input terminal supplying two channels one of which feeds a magnetic recording head and the other of which includes a threshold switch which responds to the detection of audio input by energizing a relay constituting the quick release switch.

14. A projector as set forth in claim 9, including additional circuitry having a tape-recorder input terminal supplying two channels one of which feeds a magnetic recording head through an audio-frequency hand-pass filter and the other of which supplies an amplifier via a second filter having a pass band lying above the audio-frequency range, the amplifier output supplying two circuits one of which controls operation of a relay constituting the quick release switch when an above-audio-frequency synchronizing signal is received from the tape recorder, while the other circuit supplies such synchronizing signals to a speed control circuit of the motor.

15. A projector as set forth in claim 9, including additional circuitry having a tape-recorder input terminal supplying two channels one of which includes a synchronizing-signal-frequency band-stop filter and supplies a magnetic recording head, the second channel including a synchronizing-signal-frequency band-pass filter feeding synchronizing signals via a threshold switch to two channels one of which supplies a relay constituting the quick-release switch while the other channel supplied the synchronizing signals to a speed-indicating circuit.

16. A projector as set forth in claim 9, including a generator of single-frame driving pulse which controls operation of a relay having a contact in the electrical energization circuit, a manual controller on the generator being operable to produce driving pulses at a low frequency, each pulse energizing a solenoid to release the claw for one operating cycle only.

17. A projector as claimed in claim 9, in which the electromagnetic energization circuit includes a socket connector having two contacts for connection to external control circuitry which are shunted by a further pair of contacts arranged to be opened by the fitting of a plug connector to the socket connector.

* * * * *